(12) United States Patent
Boyer, Jr.

(10) Patent No.: US 6,268,580 B1
(45) Date of Patent: Jul. 31, 2001

(54) HOLDER FOR GRAPHITE ELECTRODES

(76) Inventor: Ronald S. Boyer, Jr., 200 Ridge View La., Northumberland, PA (US) 17857

( * ) Notice: Subject to any disclaimer, the term of this patent is extended or adjusted under 35 U.S.C. 154(b) by 0 days.

(21) Appl. No.: 09/447,150

(22) Filed: Nov. 23, 1999

(51) Int. Cl.[7] .............................. B23H 1/00; B23H 7/26
(52) U.S. Cl. ....................................................... 219/69.15
(58) Field of Search ........................... 219/69.15, 69.11; 269/246, 251, 257, 87.2, 87.3, 97; 204/297 R

(56) References Cited

U.S. PATENT DOCUMENTS

| | | | |
|---|---|---|---|
| 2,847,883 | * | 8/1958 | Bagby . |
| 3,236,516 | * | 2/1966 | Young . |
| 4,713,515 | | 12/1987 | Choi .................................. 219/69.15 |
| 4,717,803 | | 1/1988 | Alexandersson .................. 219/69.15 |
| 4,958,818 | * | 9/1990 | Buchter . |
| 5,219,376 | * | 6/1993 | Vinohradsky ...................... 219/69.15 |
| 5,248,867 | * | 9/1993 | Ohba et al. ........................ 219/69.15 |

FOREIGN PATENT DOCUMENTS 8-66831 * 3/1996 (JP) .

\* cited by examiner

Primary Examiner—Geoffrey S. Evans
(74) Attorney, Agent, or Firm—William H. Eilberg

(57) ABSTRACT

A holder for a graphite electrodes of varying sizes is used in an electric discharge machine with a pair of jaws, one jaw being fixed and the other being movable relative to a support. A screw passes through threaded holes in both jaws. In a second, more preferred embodiment, the holder includes a pair of jaws mounted on a support, the jaws being threadedly engaged with a dual setscrew having threaded portions of mutually opposite orientations. A positioning setscrew anchors the dual setscrew, and prevents the dual setscrew from moving longitudinally. The electrode is centered because the jaws are maintained equally distant from the center of the support.

18 Claims, 9 Drawing Sheets

HOLDER FOR GRAPHITE ELECTRODES

BACKGROUND OF THE INVENTION

This invention relates to the field of electric discharge machining (EDM), and provides a device for holding a graphite electrode used in an EDM device.

Electric discharge machining (EDM) is a process used for machining steel. An electric arc, extending from a graphite electrode to the steel surface being machined, erodes away the steel by locally liquefying and cooling the steel, in the presence of a dielectric fluid. The key component in this process is the graphite electrode, which must be reliably supported and accurately positioned to provide a precisely machined product. Since the shape of the electrode determines the shape of the cavity formed during the EDM process, it is especially important to position the electrode accurately.

Various methods of holding the graphite electrode have been used in the prior art. It has been known, for example, to provide a holding device which grasps the electrode with a setscrew. Other methods use glue to attach the graphite to an electrode holder. Examples of holders for electrodes used in EDM are shown in U.S. Pat. Nos. 4,713,515 and 4,717,803, the disclosures of which are hereby incorporated by reference.

The electrode holding devices of the prior art generally have the disadvantage that they cannot be easily used with electrodes of widely varying sizes. Since graphite electrodes are relatively expensive, it is common to retain the unconsumed remnants of such electrodes after an EDM job is completed, for later use on another job. But using such remnants is often problematic because of their irregular size. To use a partially-consumed electrode efficiently, it is necessary to position the electrode properly relative to the workpiece.

The present invention provides a device which can conveniently and accurately hold electrodes of various sizes. The invention includes means for automatically maintaining the electrode on a desired center line, regardless of the size or shape of the electrode.

SUMMARY OF THE INVENTION

In one embodiment, the invention includes a pair of jaws mounted on a support. The support is attached to a shank which is intended to be held by an EDM device. One of the jaws is fixed to the support, and the other jaw is movable relative to the first jaw. A screw, which engages a threaded hole in the movable jaw, controls the position of the movable jaw relative to the fixed jaw. An EDM electrode can be inserted between the jaws, and rotation of the screw causes the distance between the jaws to change. The jaws can thereby be clamped around the electrode. Because of the adjustability of the jaws, the device can accommodate electrodes having a variety of thicknesses, limited only by the length of the screw and the size of the support.

In another, and more preferred embodiment, the holder includes a pair of jaws having grooves which mate with a tongue formed on a support. A threaded member, having two distinct threaded sections, is threadedly engaged in holes formed in the jaws. The threads of the two sections have mutually opposite orientations. The threaded member includes a region of reduced diameter, disposed between the threaded sections. The region is defined in part by two opposing walls. A positioning setscrew, held within a threaded hole in the support, is advanced such that the positioning setscrew enters the region of reduced diameter. The positioning setscrew has a non-threaded head whose width substantially fills the space between the walls. Thus, the threaded member is prevented from moving longitudinally when the threaded member is rotated.

Because the threaded member is prevented from moving longitudinally, when the threaded member is rotated, the rotation causes the jaws to move apart or together. Due to the position of the threaded member, the jaws maintain their relative positions relative to the center of the support. Thus, when an electrode is inserted between the jaws, the jaws can be tightened such that they maintain the electrode on center, virtually independently of the size or thickness of the electrode.

In another preferred embodiment, the non-threaded head of the positioning setscrew is eccentric relative to the longitudinal axis of the positioning setscrew. This arrangement allows one to compensate for small positioning errors caused by uncertainty about the exact position at which threaded engagement begins.

The support is rotatably mounted on a shank. The support preferably includes a plurality of tightening setscrews which, when tightened, prevent relative rotation between the support and the shank.

The invention therefore has the primary object of providing a holder for a graphite electrode used in electric discharge machining (EDM).

The invention has the further object of providing an electrode holder which can be used with a variety of electrodes, having many different sizes.

The invention has the further object of providing an electrode holder which automatically maintains the centering of the electrode regardless of the thickness of the electrode.

The invention has the further object of providing an electrode holder which permits the electrode to be easily attached and removed.

The invention has the further object of providing an adjustable holder for an EDM electrode.

The invention has the further object of providing an electrode holder which permits rotation of the workpiece.

The invention has the further object of providing an electrode holder in which an electrode can be precisely positioned.

The invention has the further object of reducing the cost of electric discharge machining, by providing an electrode holder which reduces waste of graphite electrodes.

The invention has the further object of increasing the efficiency of electric discharge machining.

The reader skilled in the art will recognize other objects and advantages of the invention, from a reading of the following brief description of the drawings, the detailed description of the invention, and the appended claims.

DETAILED DESCRIPTION OF THE INVENTION

Figure 1:
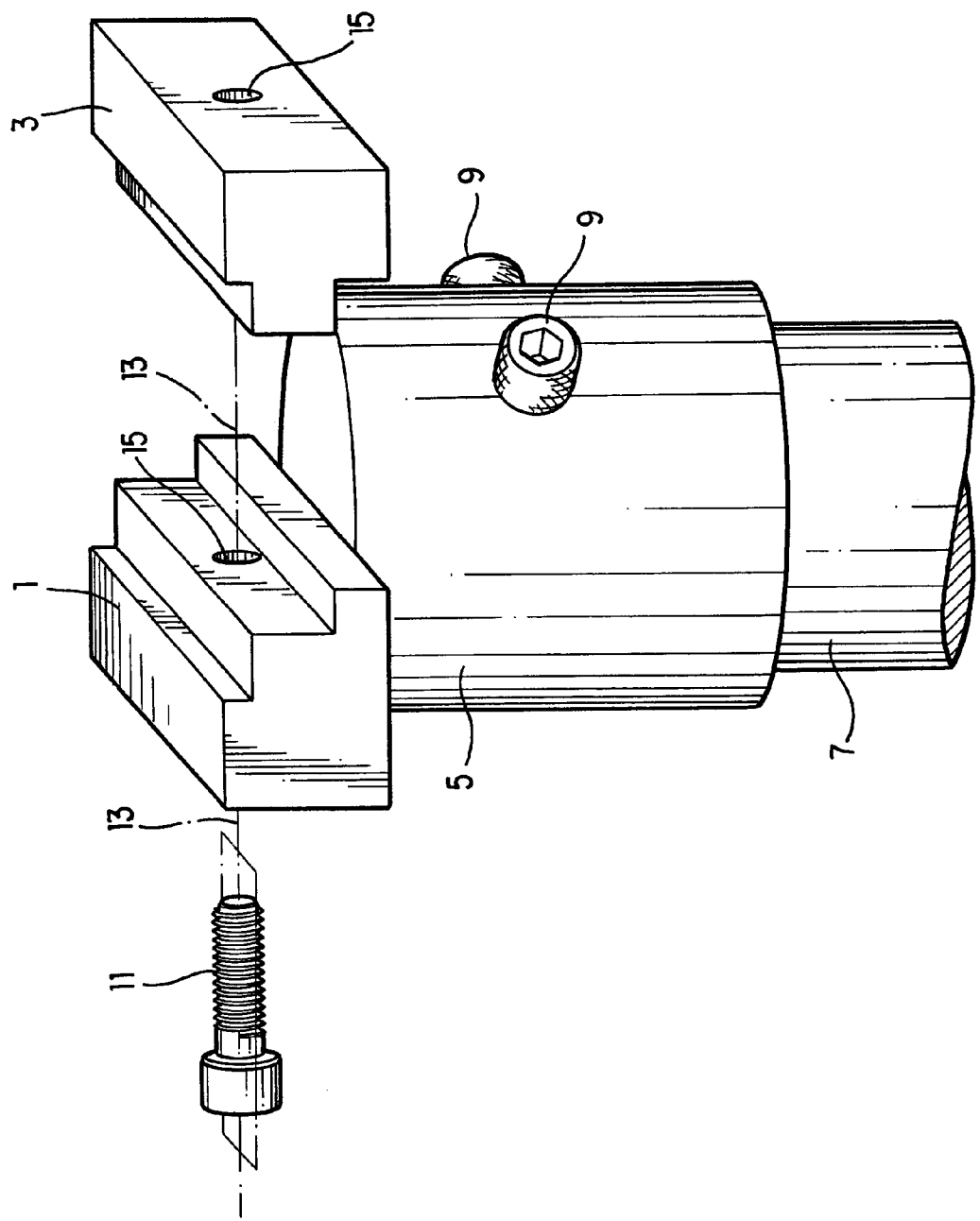
FIG. 1 provides an exploded perspective view of a first embodiment of the electrode holder of the present invention.

FIG. 1 provides an exploded perspective view of a first embodiment of the electrode holder of the present invention. The electrode holder is defined by two jaws, namely fixed jaw 1 and movable jaw 3. Both jaws have stepped cross-sections, as shown, to accommodate graphite electrodes of various shapes.

Fixed jaw 1 is mounted on support 5 which is attached to shank 7, only a portion of which is visible in the figure. The shank attaches to an EDM device in a conventional manner. The shank is inserted into a recess (not visible in the figure) in the support, and setscrews 9 are used to affix the support to the shank, so as to prevent relative rotation of the support and the shank.

Screw 11 is insertable through holes 15 formed in the jaws. Line 13 indicates the path of the screw when it is inserted, and its alignment with the holes, and does not represent a physical component.

When screw 11 is inserted through the fixed jaw, and then threaded onto the movable jaw, the movable jaw moves relative to the fixed jaw, and the jaws effectively clamp around whatever is positioned between them. Thus, a graphite electrode, or other electrode, inserted between the jaws, becomes firmly clamped between them.

Figure 2:
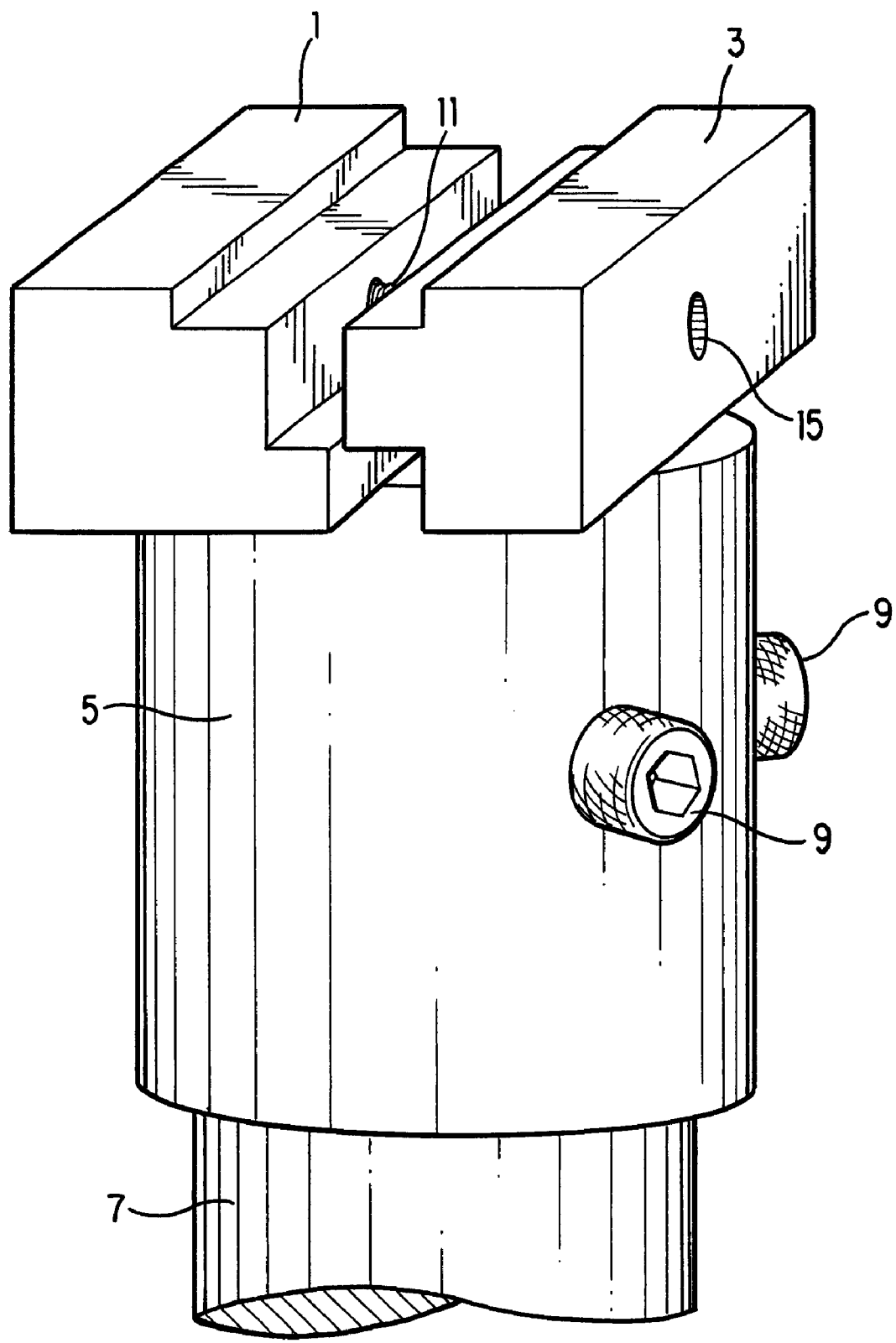
FIG. 2 provides a perspective view of the first embodiment of the present invention, in an assembled condition.
Figure 3:
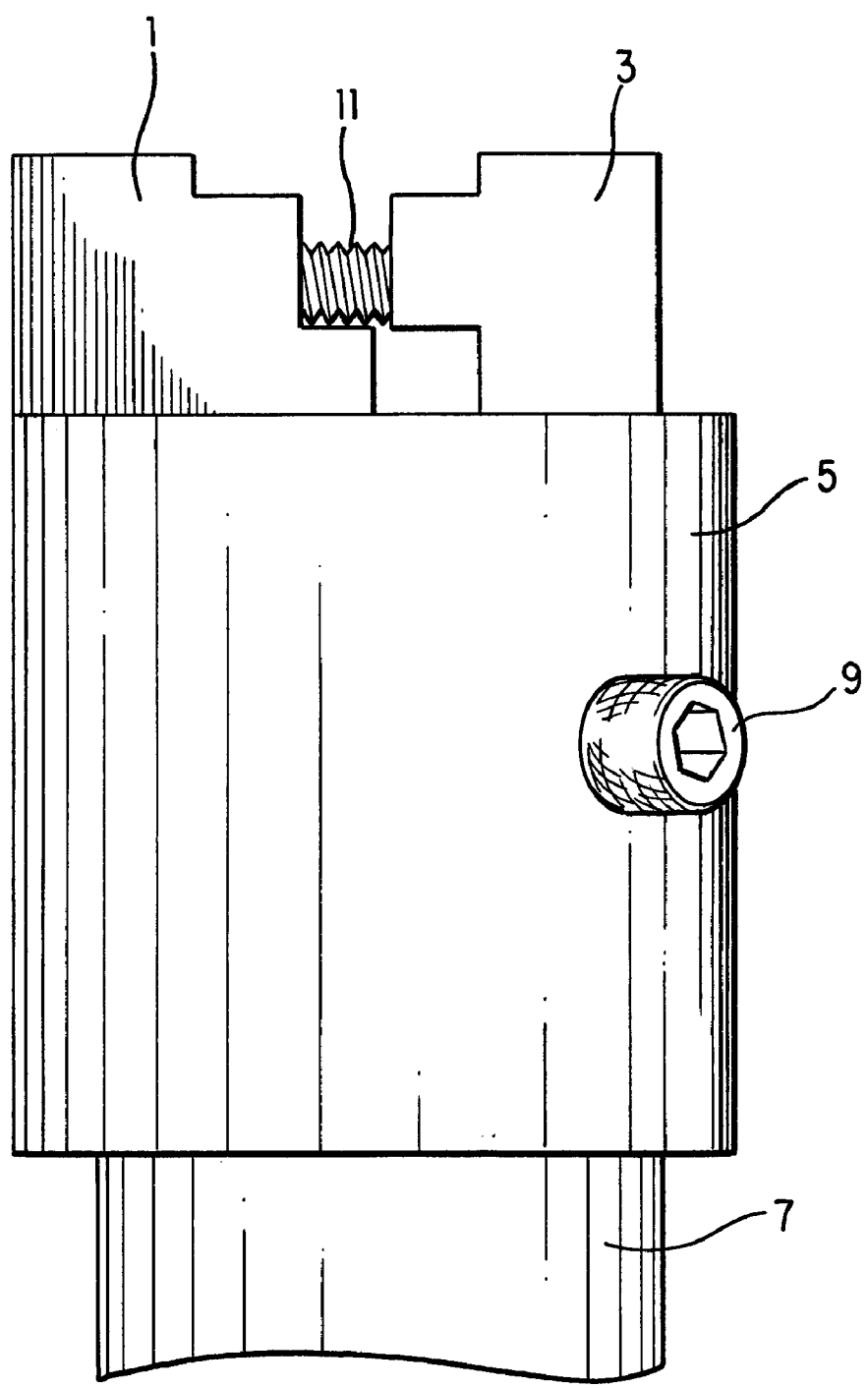
FIG. 3 provides an elevational view of the first embodiment of the present invention.

FIG. 2 shows the embodiment of FIG. 1, with the jaws positioned closer together. Screw 11 is barely visible in this figure. FIG. 3 shows the same embodiment in an elevational view which illustrates the position of the screw 11 between the two jaws.

The above-described embodiment has the advantage that it is easily adjustable, but it has the disadvantage that the electrode will not always be properly centered. For an electrode of arbitrary size, the device will hold the electrode securely, but not necessarily on-center.

FIGS. 4–8 illustrate a second, and more preferred, embodiment of the present invention. This embodiment includes two movable jaws, and does not have the disadvantage of the first embodiment.

Figure 4:
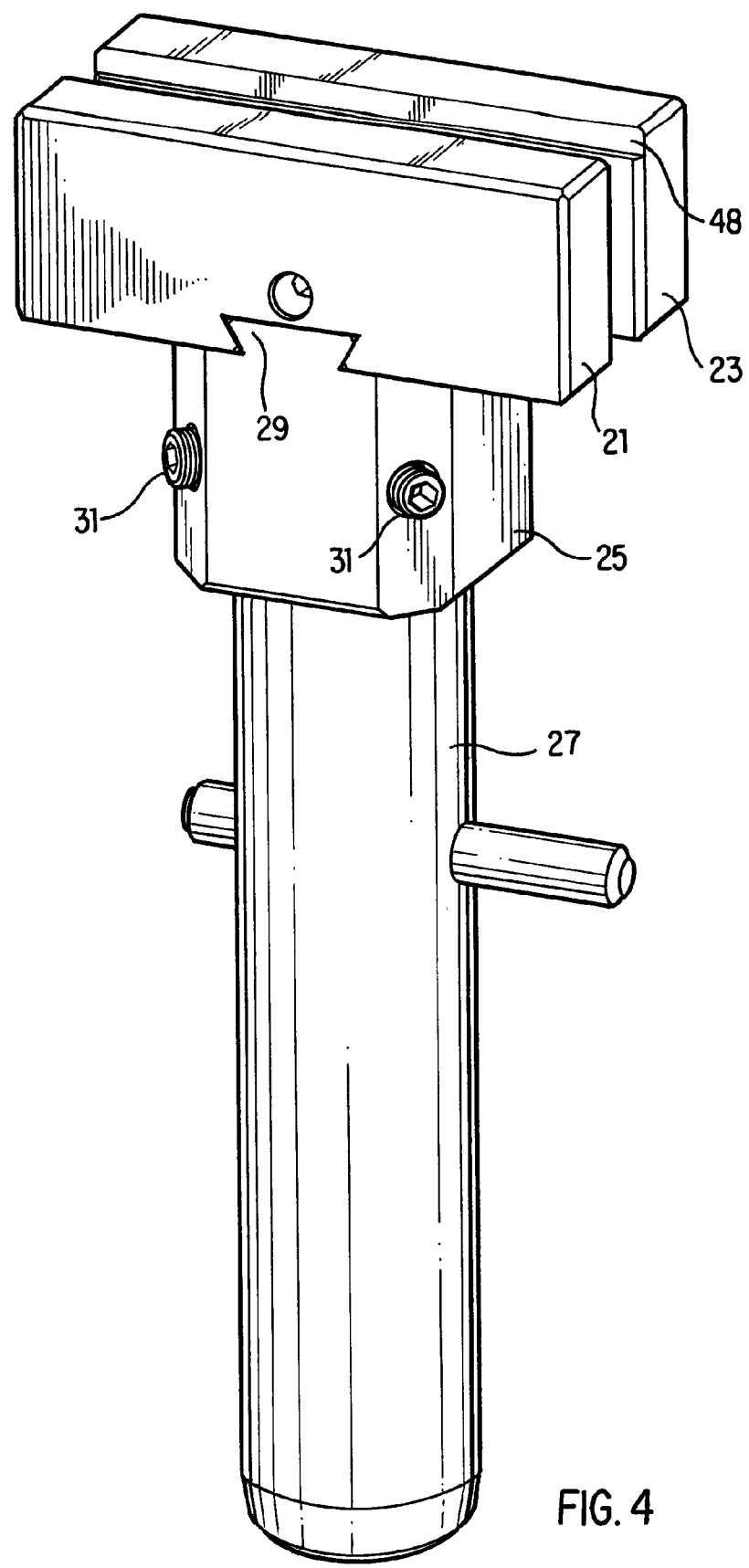
FIG. 4 provides a perspective view of an electrode holder made according to a second embodiment of the present invention.

As shown in the perspective view of FIG. 4, the electrode holder includes jaws 21 and 23, mounted on support 25 which is attached to shank 27. As in the first embodiment, the shank is of conventional construction and is suitable for attachment to an EDM device. The support includes a tongue 29 having a trapezoizal cross-section, the tongue mating with a similarly shaped groove 33 formed in the jaws (see FIG. 5). As in the previous embodiment, the shank is inserted into a recess formed in the support, and the support is affixed to the shank with tightening setscrews 31. Thus, the setscrews prevent the support from rotating relative to the shank.

Figure 5:
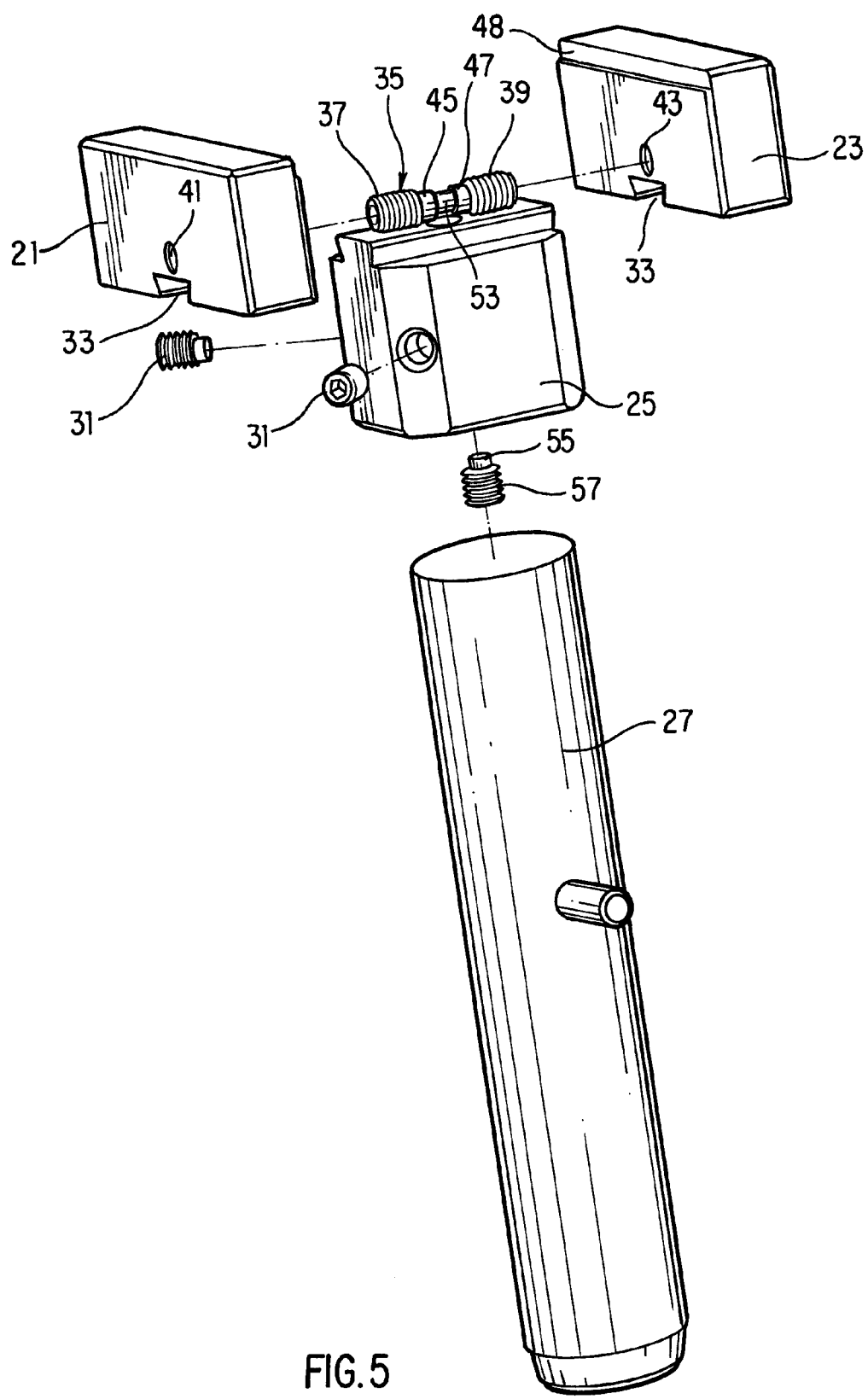
FIG. 5 provides an exploded perspective view of the electrode holder of FIG. 4.

The exploded perspective view of FIG. 5 shows dual setscrew 35 which sits between the jaws. The dual setscrew comprises a threaded member having two distinct threaded portions 37 and 39, which engage jaws 21 and 23, respectively, by screwing into threaded holes 41 and 43. FIG. 5 also shows a line indicating the alignment of the holes and the threaded portions. The threads in threaded portions 37 and 39 are oriented in mutually opposite directions. That is, if threaded portion 37 comprises a right-hand thread, then threaded portion 39 comprises a left-hand thread, or vice versa. Thus, when the dual setscrew is rotated about its longitudinal axis, the threads of the respective threaded portions will move in opposite directions, thus causing the jaws 21 and 23 to move in opposite directions.

The dual setscrew also includes non-threaded portions 45 and 47 which are adjacent to the threaded portions. These non-threaded portions define opposing walls 49 and 51. A reduced-diameter central portion 53 is located between the walls.

Figure 6:
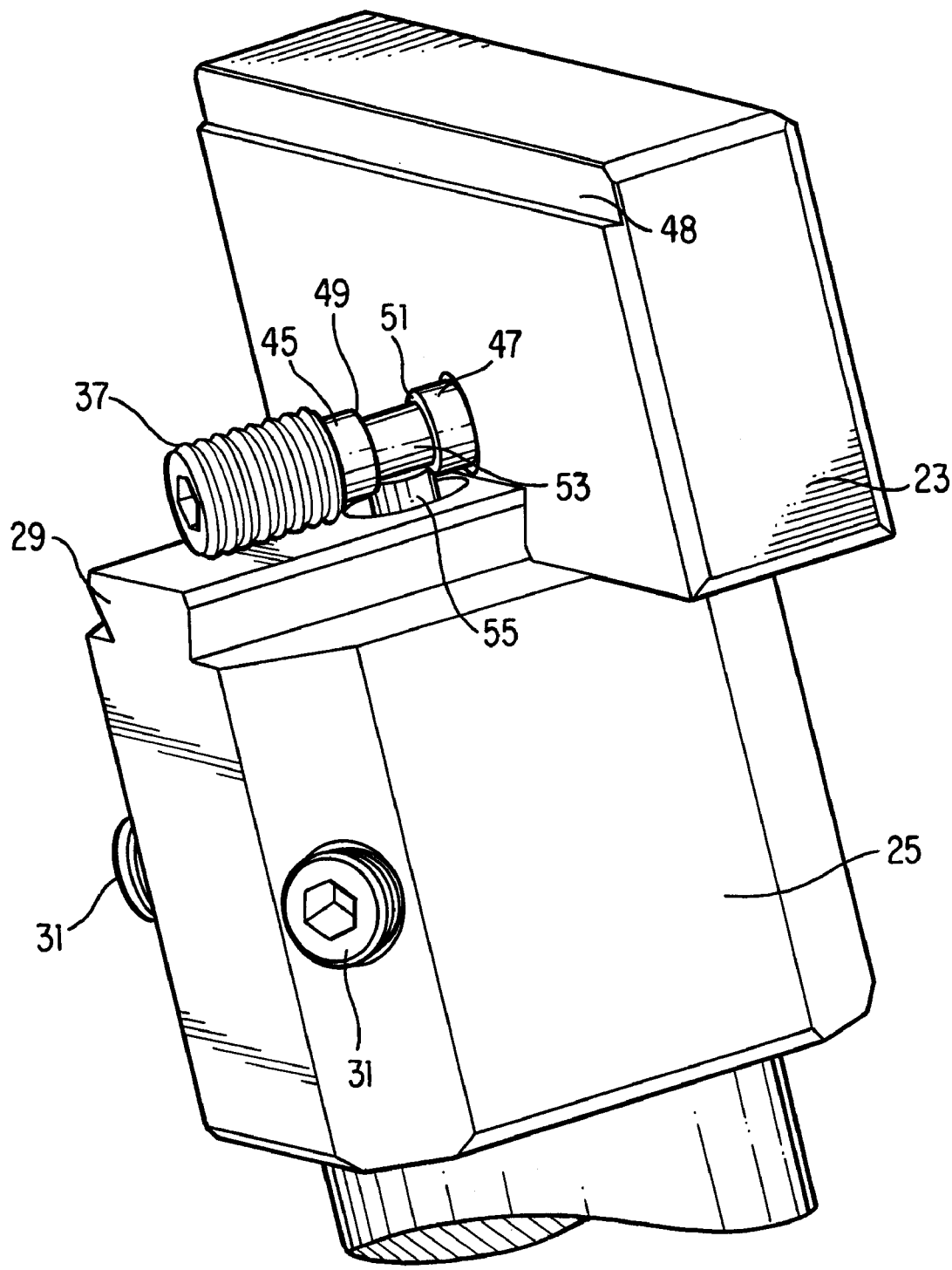
FIG. 6 provides a detailed perspective view of part of the electrode holder of FIG. 4, the figure showing the engagement of the threaded member with a positioning setscrew.
Figure 7:
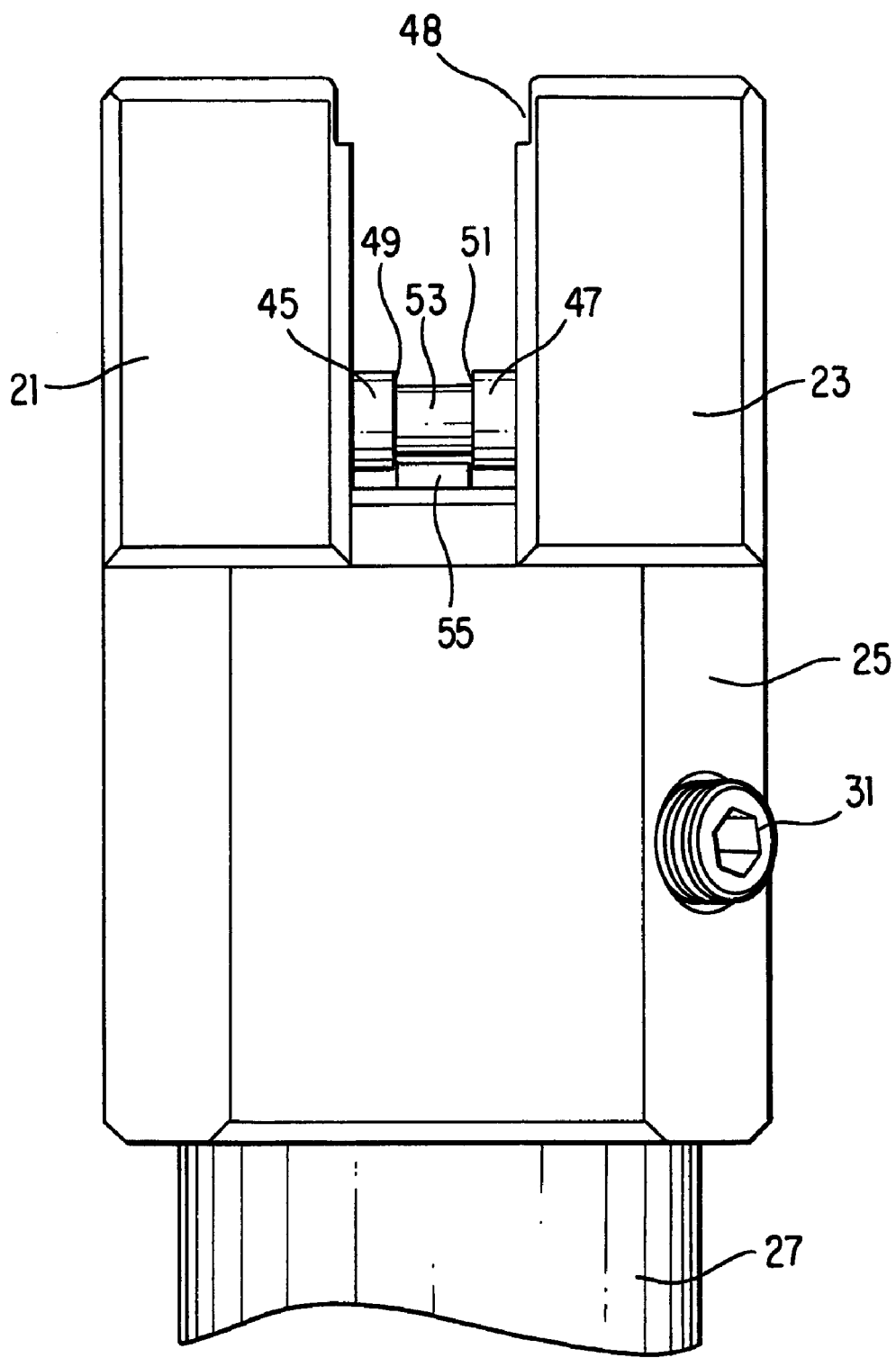
FIG. 7 provides an elevational view of the embodiment of FIG. 4, showing the location of the positioning setscrew relative to the threaded member.
Figure 8:
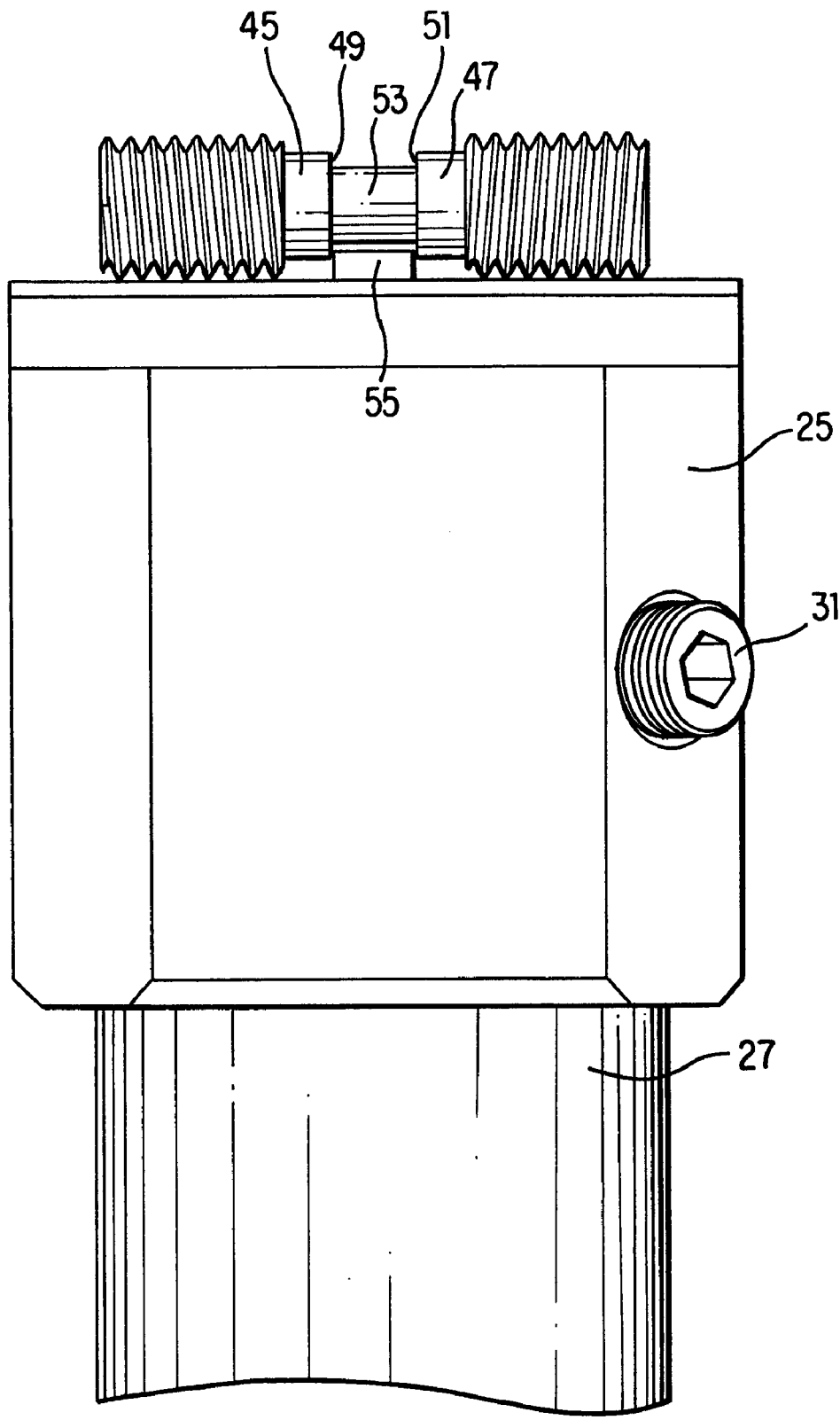
FIG. 8 provides an elevational view of a portion of the embodiment of FIG. 4, with the jaws removed to expose the dual setscrew used in this embodiment.

A positioning setscrew 57, having a non-threaded head 55, is inserted inside the support, and threaded through an appropriate threaded passage (not visible in the figures), so that the head emerges from the tongue, and fits between the walls defined by the dual setscrew. FIGS. 6–8 clearly show the head 55 of the positioning setscrew protruding out of the support, and positioned within the space between the opposing walls 49 and 51. As illustrated most clearly in FIGS. 7 and 8, the head of the positioning setscrew need not contact the reduced-diameter portion 53. Instead, there is a small clearance between these components. The positioning setscrew is located sufficiently close to the reduced-diameter portion such that it substantially fills the space between the walls, and therefore prevents the dual setscrew from moving along its longitudinal axis.

When the positioning setscrew is in the position shown, rotation of the dual setscrew causes the jaws to move apart or together. The distance between the jaws then changes, but both jaws are equidistant from the center of the support. Like the first embodiment, this device will accommodate graphite electrodes having various thicknesses. But unlike the first embodiment, this device will maintain the centering of the electrode, regardless of its thickness. The positioning setscrew prevents the jaws from moving in directions other than as described, when the dual setscrew is turned.

The dual setscrew is turned by inserting a hex wrench, such as an Allen wrench or its equivalent, into the holes in the jaws, and turning the wrench as needed. Since the dual setscrew is a unitary body, and due to the mutually opposite orientation of its threaded portions, turning one side of the dual setscrew causes the entire body to rotate, thereby causing both jaws to move apart or together simultaneously.

The present invention solves another problem associate with electrode holders. In the embodiment illustrated in FIGS. 4–8, a small error in positioning the jaws may be introduced, due to the fact that when the dual setscrew is "started" into the threaded opening of the jaw, one does not know, with precision, when the setscrew becomes engaged with the threads. Thus, the lateral position of the jaws is not known exactly. This uncertainty can be a disadvantage in situations where exact positioning of the jaws is essential.

One solution to the above described problem is provided by stepped portions 48 formed near the top of the jaws 21 and 23. These stepped portions can be cut into the jaws after the jaws have engaged the dual setscrew, and the electrode is then held within the vertical walls of the stepped portions. The depth of the stepped portion is chosen to compensate exactly for the error introduced by the uncertainty about the engagement of the threads.

The problem with the above arrangement, however, is that it will work only as long as the jaws are kept in engagement with the dual setscrew. If the jaws are separated from the dual setscrew, the threading error will occur again when the jaws are re-engaged with the dual setscrew. Thus, with the above arrangement, it is necessary to keep the jaws engaged with the dual setscrew. But requiring the jaws to be so engaged reduces the versatility of the invention.

Figure 9:
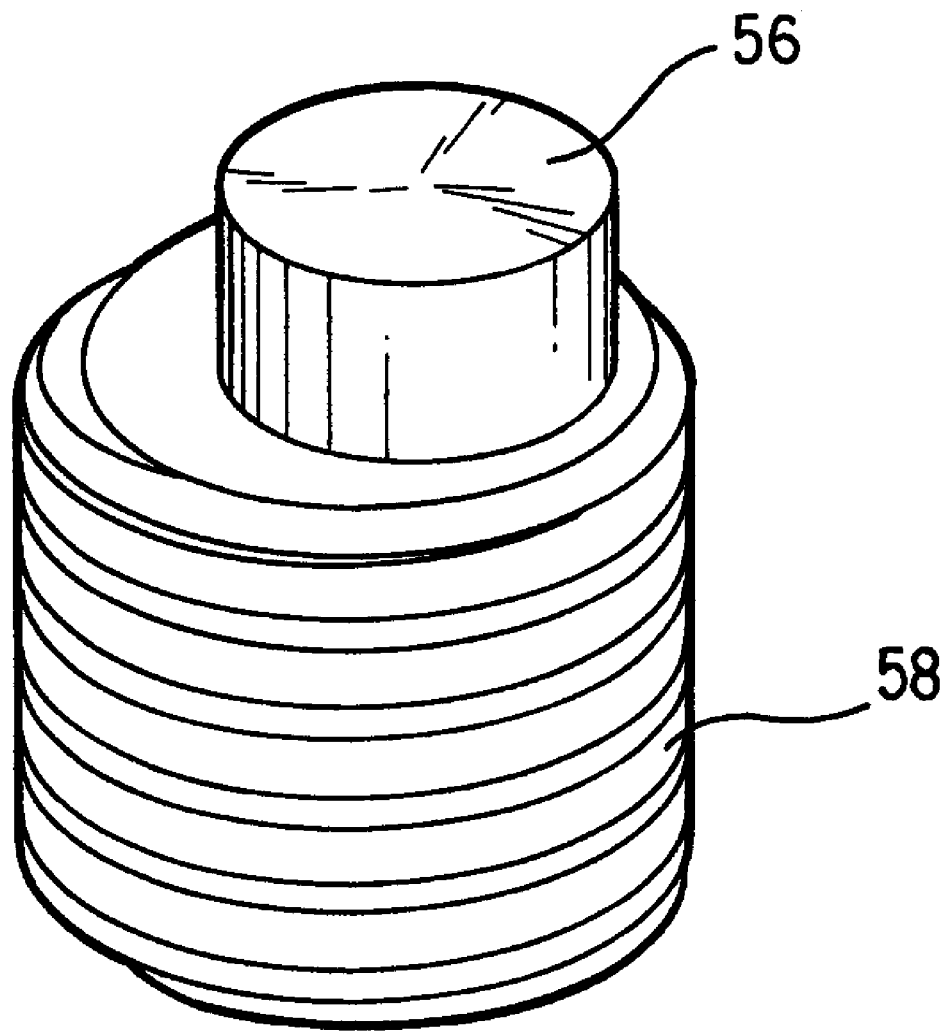
FIG. 9 provides a perspective view of an alternative embodiment in which the head portion of the positioning setscrew is eccentric relative to the axis of the setscrew.

Another, and more preferred, solution is represented by FIG. 9. FIG. 9 depicts a positioning setscrew 58 which is intended to replace the positioning setscrew 57 of FIG. 5. Positioning setscrew 58 has a head 56 which is eccentric relative to the longitudinal axis of the positioning setscrew. Thus, when the positioning setscrew 58 is rotated about its axis, the eccentric head 56 will move along a circular path. It will be appreciated, from inspection of the figures, that such movement of the head 56, when the head is positioned within the space between opposing walls 49 and 51, will cause the dual setscrew to move laterally, i.e. along its longitudinal axis. Such movement of the dual setscrew can compensate for slight positioning errors introduced by the uncertainty caused by the threads, discussed above.

The preferred embodiments, shown in FIGS. 4–9, therefore have the following advantages:

1) The invention provides a convenient means for clamping an electrode to an electrode holder, without the use of screws or other fasteners affixed to the electrode. The electrode is held only by the compressive force of the jaws, and can be released easily when the jaws are opened. It is therefore very easy to remove one electrode from the holder and replace it with another.

2) The electrode remains on-center regardless of the spacing of the jaws. The dual setscrew and positioning setscrew assure that both jaws remain equidistant from the center of the support. This feature makes it much more convenient to perform EDM, as it is now feasible to position the electrode properly even if the electrode has an odd shape. Thus, this feature tends to reduce the tendency to waste electrode material.

3) The electrode holder is adjustable. It will work with electrodes having varying sizes.

4) The electrode holder prevents unwanted rotation of the workpiece, by providing a means for affixing the support to the shank such that these components do not rotate relative to each other.

The present invention makes it convenient to use odd pieces of electrode material that have been saved from prior EDM jobs. Regardless of their sizes and shapes, the holder of the present invention makes it practical to use such odd pieces in an EDM process.

While the invention has been explained with respect to the particular embodiments described above, the invention can be modified in various ways. The exact number and spacing of the tightening setscrews can be changed, for example. The particular shapes of the jaws can be varied. The shape of the tongue and groove can be altered. These and other similar modifications, which will be apparent to those skilled in the art, should be considered within the spirit and scope of the following claims.

What is claimed is:

1. A holder for a graphite electrode, comprising:
   a) a pair of jaws,
   b) a threaded member having two distinct threaded sections, the threaded sections being threadedly engageable with the pair of jaws, and
   c) a support for holding the threaded member and the jaws, wherein the support includes a tongue having a shape which mates with corresponding grooves formed in the jaws.

2. A holder for a graphite electrode, comprising:
   a) a pair of jaws,
   b) a threaded member having two distinct threaded sections, the threaded sections being threadedly engageable with the pair of jaws, and
   c) a support for holding the threaded member and the jaws,
   wherein the threaded member includes a region of reduced diameter located between said threaded sections, the holder further comprising a positioning setscrew having a head which fits within said region of reduced diameter.

3. The holder of claim 2, wherein the head of the positioning setscrew is eccentric relative to a longitudinal axis of the positioning setscrew.

4. The holder of claim 2, wherein said region of reduced diameter is defined by two opposing walls, and wherein the positioning setscrew has a width which substantially fills a space between said walls.

5. A holder for a graphite electrode, comprising:
   a) a pair of jaws,
   b) a threaded member having two distinct threaded sections, the threaded sections being threadedly engageable with the pair of jaws, and
   c) a support for holding the threaded member and the jaws, further comprising a shank, the shank being received in the support.

6. The holder of claim 5 wherein the support includes at least one tightening setscrew, the tightening setscrew being oriented such that, when tightened, the tightening setscrew prevents relative rotation of the support and the shank.

7. A holder for a graphite electrode, comprising:
   a) first and second jaws, the first jaw being held by a support and being stationary relative to the support, the second jaw being movable relative to the support, the second jaw including a threaded hole, and
   b) a threaded member extending through the threaded hole in said second jaw,
   further comprising a shank, the shank being received in the support, wherein the support includes at least one tightening setscrew, the tightening setscrew being oriented such that, when tightened, the tightening setscrew prevents relative rotation of the support and the shank.

8. A holder for a graphite electrode, comprising:
   a) a pair of jaws, the jaws having threaded holes,
   b) a threaded member having two distinct threaded sections, the threaded sections being threadedly engageable in said threaded holes,
   c) a support for holding the jaws,
   d) a shank which is received in the support,
   e) at least one tightening setscrew, adapted to be threaded into a threaded opening in the support, wherein the tightening setscrew engages the shank so as to prevent relative rotation of the support and the shank, and
   f) a positioning setscrew threaded into a passage formed in the support, the positioning setscrew having a head which is shaped to fit between the threaded sections of the threaded member, and to prevent movement of the threaded member along its longitudinal axis.

9. The holder of claim 8, wherein the head of the positioning sets screw is eccentric relative to a longitudinal axis of the positioning setscrew.

10. The holder of claim 8, wherein the support includes a tongue having a shape which mates with corresponding grooves formed in the jaws.

11. The holder of claim 8, wherein the threaded member includes a region of reduced diameter located between said threaded sections, and wherein the positioning setscrew fits within said region of reduced diameter.

12. The holder of claim 11, wherein said region of reduced diameter is defined by two opposing walls, and wherein the positioning setscrew has a width which substantially fills a space between said walls.

13. A holder for a graphite electrode, comprising:
   a) a pair of jaws, the jaws having threaded holes,
   b) a threaded member having two distinct threaded sections, the threaded sections being threadedly engageable in said threaded holes,
   c) means for supporting the jaws,
   d) a shank which is received in the supporting means,
   e) means for tightening the supporting means against the shank so as to prevent relative rotation of the support and the shank, and
   f) means for positioning the threaded member such that the threaded member does not move along its longitudinal axis.

14. The holder of claim 13, wherein the positioning means comprises a positioning setscrew having a head which is sized to fit between said threaded sections of said threaded member.

15. The holder of claim 14, wherein the head of the positioning setscrew is eccentric relative to a longitudinal axis of the positioning setscrew.

16. The holder of claim 13, wherein the tightening means comprises at least one tightening setscrew adapted to be threaded into threaded openings in the supporting means.

17. A holder for a graphite electrode, comprising:
   a) a pair of jaws,
   b) a threaded member having two distinct threaded sections, the threaded sections being threadedly engageable with the pair of jaws, the threaded member having a longitudinal axis,
   c) a support for holding the threaded member and the jaws, and
   d) means for preventing the threaded member from moving along said longitudinal axis.

18. The holder of claim 17, further comprising a shank, the shank being received in the support, wherein the support includes at least one tightening setscrew, the tightening setscrew being oriented such that, when tightened, the tightening setscrew prevents relative rotation of the support and the shank.

* * * * *